(12) United States Patent
Schutz

(10) Patent No.: US 7,254,929 B1
(45) Date of Patent: Aug. 14, 2007

(54) PROCESS AND MACHINE FOR PACKING PASTY, LIQUID OR SEMILIQUID PRODUCTS

(76) Inventor: Jorge Antonio Schutz, deceased, late of Buenos Aires (AR); by Alejandro Javier Schutz, legal representative, Paraguay 1307 2nd floor "24" - (C105744U), Buenos Aires (AR)

( * ) Notice: Subject to any disclaimer, the term of this patent is extended or adjusted under 35 U.S.C. 154(b) by 0 days.

(21) Appl. No.: 10/486,247

(22) PCT Filed: Aug. 10, 2000

(86) PCT No.: PCT/IB00/01248

§ 371 (c)(1),
(2), (4) Date: Nov. 29, 2004

(87) PCT Pub. No.: WO02/11545

PCT Pub. Date: Feb. 14, 2002

(51) Int. Cl.
*B65B 9/00* (2006.01)

(52) U.S. Cl. .......................... 53/450; 53/555; 452/30; 452/35

(58) Field of Classification Search .................. 53/450, 53/433, 553, 555, 546–548, 529, 530, 202, 53/374.4; 452/30–34, 37–45; 426/410, 426/412, 392
See application file for complete search history.

(56) References Cited

U.S. PATENT DOCUMENTS

| | | | | |
|---|---|---|---|---|
| 2,816,837 A | | 12/1957 | Holsman | 99/171 |
| 3,164,935 A | * | 1/1965 | Stroop | 53/546 |
| 3,266,911 A | * | 8/1966 | Clement | 452/24 |
| 4,015,021 A | * | 3/1977 | Harima et al. | 426/393 |
| 4,169,344 A | * | 10/1979 | Ganz et al. | 53/546 |
| 4,730,367 A | * | 3/1988 | Vinokur | 452/32 |
| 4,759,170 A | | 7/1988 | Sawa et al. | 53/551 |
| 5,053,239 A | * | 10/1991 | Vanhatalo et al. | 426/412 |
| 5,084,283 A | * | 1/1992 | Oxley et al. | 426/87 |
| 5,813,197 A | | 9/1998 | Aguzzoli | 53/453 |
| 6,135,869 A | * | 10/2000 | Schutz | 452/32 |

FOREIGN PATENT DOCUMENTS

WO    WO 00/24262    5/2000

* cited by examiner

*Primary Examiner*—Thanh Truong
(74) *Attorney, Agent, or Firm*—Christa Hildebrand; Norris McLaughlin & Marcus PA

(57) ABSTRACT

Process and machine for packing pasty, liquid or semiliquid products comprising: nonstop feeding two sheets (1, 2) sandwiching ducts (3) ending in nozzles (4) feeding pasty, liquid or semiliquid products to be packed (M); nonstop longitudinally sealing the said sheets (1, 2) through longitudinal continuous beads (5) adjacent to the said continuous sleeves (6); forming through the said longitudinal sealing narrowings arranged at intervals longitudinally regular in the said sleeves (6) making possible the passage of the said ducts (3) and defining in the sleeves (6) long, wide lengths (8) and short narrow lengths (9); nonstop injecting with nozzles (4) material (M) within the said sleeves (6) which are inflated forming units (28) of material (M) with prior pressure closing of a narrow length (9) each sleeve advanced to each nozzle (4) while the sheets (1, 2) are moving forwards, and pressure closing and transversally sealing at regular intervals the said sleeves (6) filled with material (M).

11 Claims, 3 Drawing Sheets

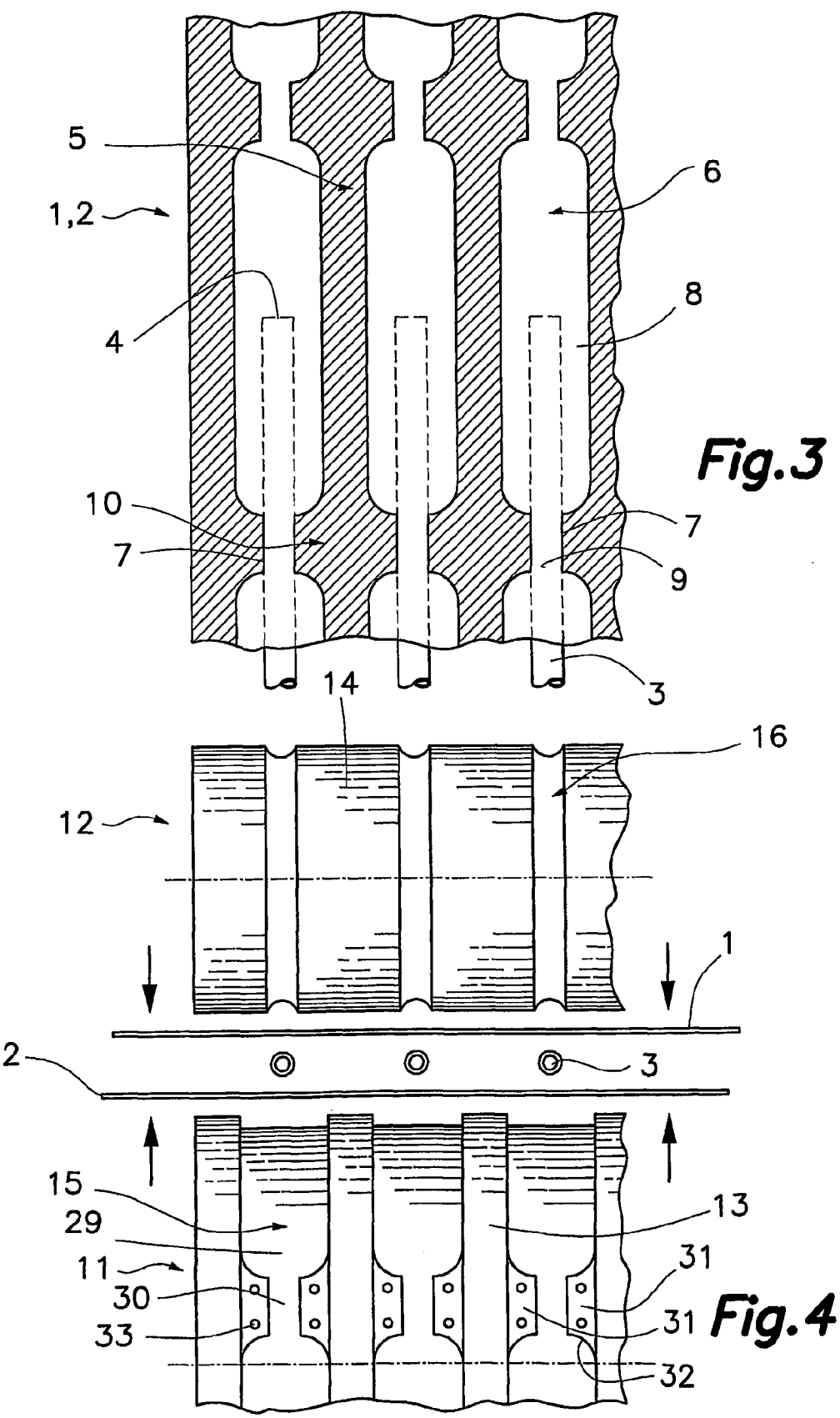

PROCESS AND MACHINE FOR PACKING PASTY, LIQUID OR SEMILIQUID PRODUCTS

FIELD OF THE INVENTION

This invention relates to a process for packing pasty, liquid or semiliquid products and a machine for carrying out said process. This invention concerns the continuous production of sausages the characteristics of which as end product thus obtained has significant advantages with respect the prior state of the art.

In a preferred embodiment, the process and the machine of this invention will be applied to producing and packing sausages currently known as "German sausages" or "Frankfurt" type without using a synthetic gut conforming the sausage which is to be removed for finally vacuum packing the product. That is to say, the process and machine according to the invention allow to directly produce the sausage in the end packing, which thereafter allows to cook the sausage paste thus packed.

More particularly, the invention relates to a process of the type comprising following steps:

forwards nonstop feeding a pair of sheets, generally of a plastic material, respectively above and under a plurality of injection feeding ducts a pasty, liquid or semiliquid material to be packed (M) said ducts being arranged in an array extending parallel to the forwards run of the said sheets and ending in respective injection nozzles; longitudinally nonstop sealing, for example through heat welding, said pair of sheets to each other by forming continuous beads, longitudinally sealed at both side of each of the said feeding ducts producing oblong hollow sleeves laterally limited by the said beads;

nonstop injecting, under pressure, material to be packed (M) from the said nozzles into the said hollow laminar sleeves after having closed under pressure a narrow length of each sleeve before each nozzle, while the sheets are running forwards, and closing under pressure and cross sealing at regular interval the said laminar sleeves filled with material (M) to be injection packed.

BACKGROUND OF THE INVENTION

Argentinean applications for a patent of invention P 96 01 05634 and WO 00/24262 of this inventor disclose a process and a machine including the general characteristics above mentioned.

In the said process the said hollow ducts or longitudinal bags, delimited by the weld beads from the two sheets are obtained by moulding and for this purpose the said sheets pass dragged between a pair of pushing rollers arranged parallel and tangentially into contact with each other, one of the said rollers being provided with means for conforming the half of individual moulds of the product to be packed, while the other roller is also provided with means conforming the half of the individual moulds of the product to be packed.

Such shaping or moulding to achieve a suitable configuration exerts too much efforts on the sheets when moving forwards dragged by the said rollers the said sheets sustaining unavoidable deformations because of the action between the rollers themselves (with moulding grooving) and the conforming means (constituted by pressing disks) which can weaken the said sheets with the risk for the safety of the product packed. In addition, the process requires a very accurate operating coordination of a series of mechanical elements and stretching the sheets in at least the areas designed to be heat sealed between them which is carried out further to forming the individual moulds, which makes difficult to carry out the process with effective results and a good performance.

Another interesting document of the state of the art is patent U.S. Pat. No. 5,514,029 of the inventor himself, in which each of the sausages are obtained from a laminar duct by forming them with a shaping assembly which acts on the duct filled with material to be packed.

Another process which seeks to form the container from two heat welded sheets for producing German type sausage directly within the end container appears disclosed in patent U.S. Pat. No. 5,053,239 although that method is of intermittent sequence and requires a synchronism between feeding portions which forms the sausage and the means for cross closing the container.

Another process also based on a nonstop feeding system appears disclosed in patent AR 228,903 of the year 1982 of this inventor, which operates feeding moulding recesses between the longitudinally pre-welded sheets but the recesses of which are intercommunicated by smaller channels producing a zigzag run between the sheets for thereafter sealing the areas on which the channels are arranged.

By means of the process and machine of this invention, the production of pasty, liquid and semiliquid products in general and of sausages in particular is achieved, in a nonstop operation, using a container which is only shaped through the pressure of the product, with a very effective closing of the ends of each individual container, preventing most of the drawbacks arising from the complexity and interaction between moulding or shaping parts of those of the background mentioned up to now, and namely deformations and uneven loads on the laminar structure of the containers.

In the particular case of packaging German type sausages, the sausage packing is achieved without using a synthetic gut shaping the product.

Thus, according to this invention, the sausage is packed within the definitive container to be delivered to the public and thereafter it sustains the cooking operation which guarantees the product sterility or pasteurization during the process of production and the steps of shaping within the gut and further peeling off are spared. The pressure with which the sausage paste is packed remove any possibility that the air within the container which can affect it later on.

SHORT EXPLANATION OF THE INVENTION

This invention applied to packing products in pasty, liquid or semiliquid condition is characterized in a process comprising following steps:

a) nonstop feeding a pair of sheets, respectively above and under a plurality of injection feeding ducts a pasty, liquid or semiliquid material to be packed said ducts being arranged in an array extending parallel to the forwards run of the said sheets and ending in respective injection nozzles;

b) longitudinally nonstop sealing, for example through heat welding, said pair of sheets to each other by forming continuous beads, longitudinally sealed on both side of each of the said feeding ducts producing continuous oblong wrappings or sleeves laterally limited by the said beads;

c) forming by means of the said longitudinal sealing some narrowings arranged at longitudinally regular intervals on said flat sleeves, without shaping the higher and lower walls of the said oblong wrappings, said narrowings having a width just sufficient to let pass one of the said feeding ducts, so that wide relatively long lengths are defined within the said sleeves the said wide lengths are connected to each other by narrow relatively short lengths, corresponding to the said narrowings;

d) longitudinally cooling the sealed areas of the sheets;

e) nonstop injecting, under pressure, a material to be packed from the said nozzles into the said sleeves which are inflated forming units of packed material, after having closed under pressure a narrow length of each sleeve before each nozzle, while the sheets are running forwards, and f) closing under pressure and cross sealing at regular interval the said sleeves filled with material to be injection packed.

As it can be seen and with relation to mentioned earlier Argentinean application for a patent P 96 01 05634 and document WO 00/24262, the essential difference stands in step c), that is to say, in forming by heat welding a particular contour of the end parts of the sleeves which will constitute the container for the sausages when inflated during the pressure feeding of the product through the said nozzles. This makes that the laminar part configuring the container does not sustain any deformation or too much effort, the strengths been limited only to being inflated during the filling of each recess, the shape and sizes of which are very accurately obtained without epithelial wrinkles as the limits of the container comes from a sealing operation of its perimeter.

According to the invention, the pressure on all the injection feeding ducts is kept approximately constant.

According to an advantageous embodiment of the invention, the transition from the wide lengths to the narrow lengths is carried out by means of at least curvilinear arcuated sealing lines.

In a preferred example of embodiment, the said narrowings are configured by means of widenings at areas opposite to each pair of longitudinally sealed beads defining one of the said sleeves, the said areas extending towards the inner part of the said sleeves up to close both sides of the area which occupies each feeding duct.

Other characteristics and advantages of the invention will be more clear from the explanation of an example of embodiment of the process on the basis of a machine illustrated in the appended drawings for illustration purpose only.

SHORT EXPLANATION OF THE DRAWINGS

FIG. 3 is a part plane view of the assembly of the two heat welded sheets, illustrating the configuration of each of the containers.

FIG. 4 illustrates an elevation view and apart from each other the assembly of heating roller and pressing roller in addition to the two sheets and the assembly of injecting ducts, the said rollers allowing to obtain the sheets heat welding as illustrated in FIG. 3, constituting the essential point of this process.

DETAILED EXPLANATION OF AN EXAMPLE OF EMBODIMENT OF THE INVENTION

Figure 2:
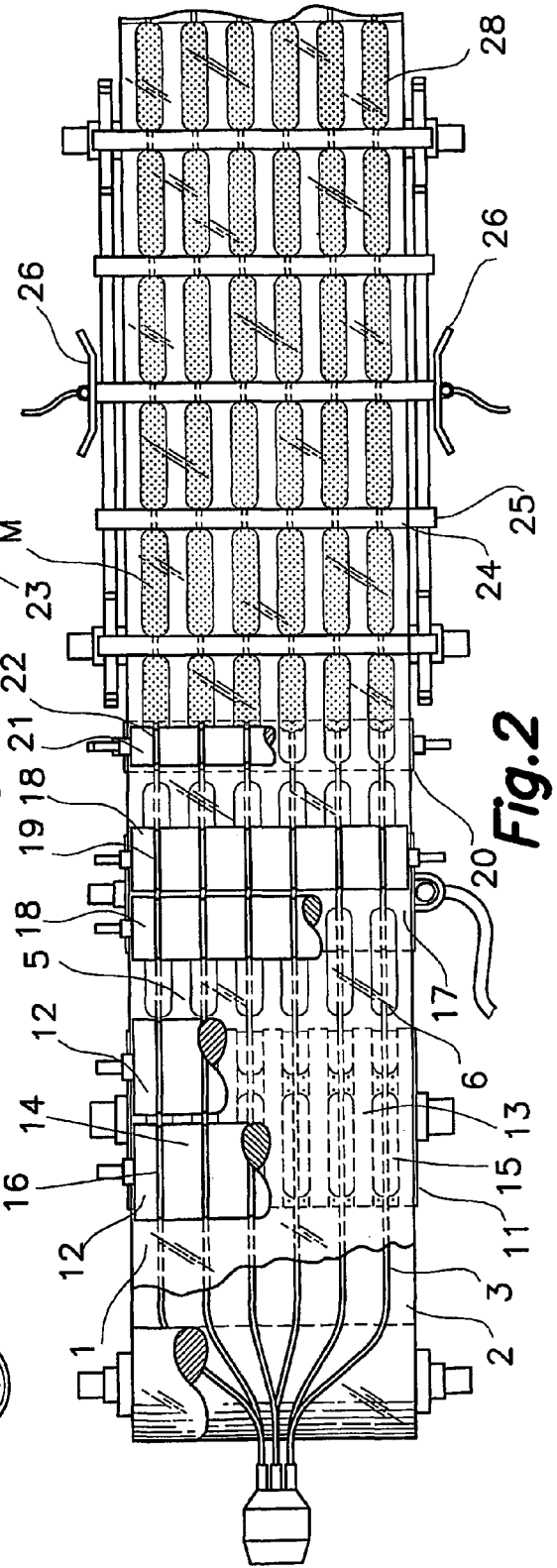
FIG. 2 is a top view of the machine of FIG. 1 showing the arrangement of the feeding rollers associated to the sealing cylinder, pressing rollers associated to the cooling cylinder and pressing-closing rollers of an end of the sleeve forming a container as well as the conveying means with the welding cross bars or jaws.

According to said Figs. the machine for packing pasty, liquid or semiliquid products this invention proposes for the embodiment of mentioned process comprises, sequentially arranged:

means for forwards nonstop feeding a pair of sheets (1, 2), of a thermoplastic material, delivered from bobbins respectively above and under a plurality of feeding ducts (3) a pasty, liquid or semiliquid material to be packed (M) said ducts (3) being arranged parallel to the forwards run of the said sheets (1, 2) as it can be seen in FIG. 2 and ending in respective injection nozzles (4);

a heating roller (11) and two pressing rollers (12) on which respective cylindrical surfaces (13, 14) respective circumferential grooves (15, 16) are worked, facing each other, for forming longitudinally heat sealed beads (5) at both sides of each of the said feeding ducts (4);

a cooled roller or cylinder (17) and at least a pressing roller (18), both provided with circumferential grooves (19), facing each other, for cooling the welding of said heat sealed beads (5).

a pair of closing rollers (20, 21) provided with circumferential grooves (22), facing each other, located just before the said injection nozzles (4) for pressing the sheets (1, 2) to each other and against the external surfaces of the feeding ducts (3) in order to prevent that the material to be packed (M) flows rearwards and that air inputs within the sleeves (6) which are being filled; and a plurality of pairs of cross-bar-shaped jaws (23, 24), which are respectively located above and under the narrow areas (9) of the sleeves (6) filled with material to be injection packed (M), pressing the higher and lower walls thereof against each other to lean them and to move them forwards in this position together with the sheets (1, 2) a path along which at least one jaw (23) of each of the pairs of jaws (23, 24) is heated to transversally seal a strip of the said sheets (1, 2).

Figure 1:
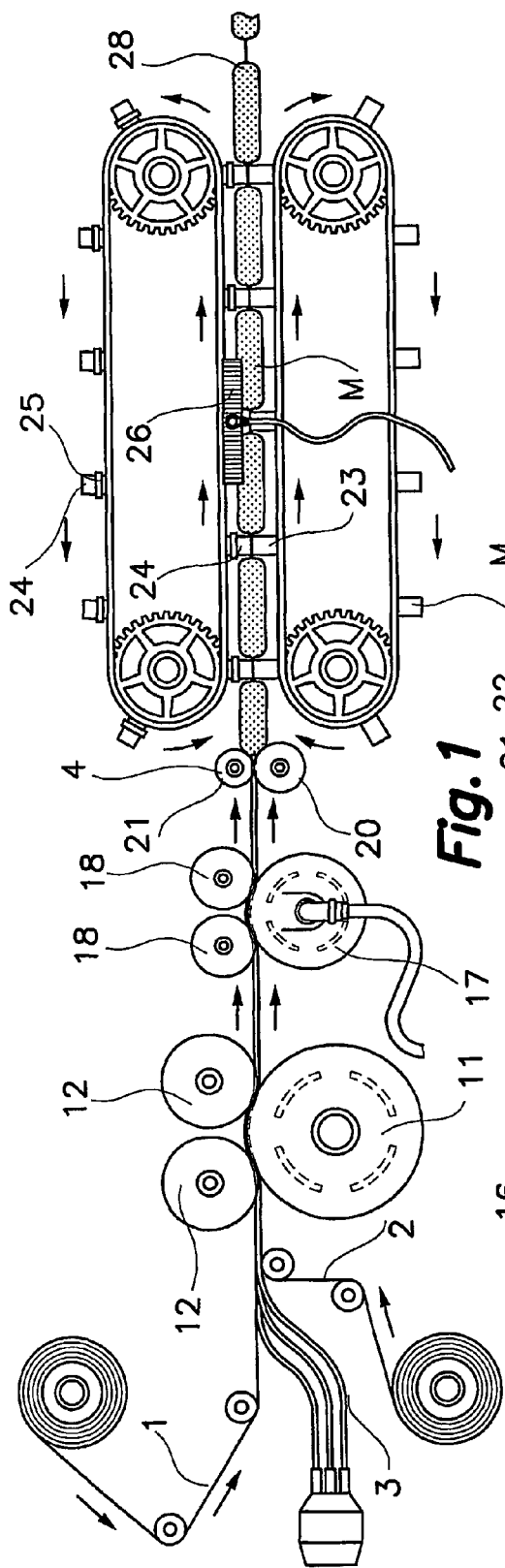
FIG. 1 is a side elevation view diagrammatically showing a machine used for carrying out the sequence of steps of the process of this invention.

The purpose of such an assembly of heating (11) and pressing rollers (12) is to longitudinally nonstop heat sealing the higher (1) and lower (2) sheets of plastic material coming from the bobbins illustrated in FIG. 1, between the said sheets (1, 2) there is arranged a plurality of feeding ducts (3) of material to be packed, so that the result is longitudinal welded areas between which longitudinal sleeves or bags (6) are defined formed by two superposed separate coats of laminar material (1, 2) within each of the said bags and between both coats (1, 2) one of the mentioned feeding duct (3) is arranged.

The essential inventive aspect of this process and machine stands in the fact that the said heat sealed longitudinal sleeves or bags faithfully follow the shapes of the said grooves (15) of the heating roller (11), that is to say, that because of the said narrowings (30) of the grooves (15), in the said longitudinal bags (6) with two superposed separate coats (1, 2) relatively long wide lengths (6) are defined designed to form a packing unit, connected to each other by narrow shorter lengths (9) which allow the passage of the feeding ducts (3) up to an injection area where it is proceeded to filling the said bags, thereafter the operation of crosswise pressure closing and sealing being carried out on the said narrow lengths in order to isolate the said filled packing units.

Therefore, it is essential to guarantee the said faithfulness of the longitudinal heat sealed areas to the shapes of the said grooves (15) of the heating roller (11).

Figure 5:
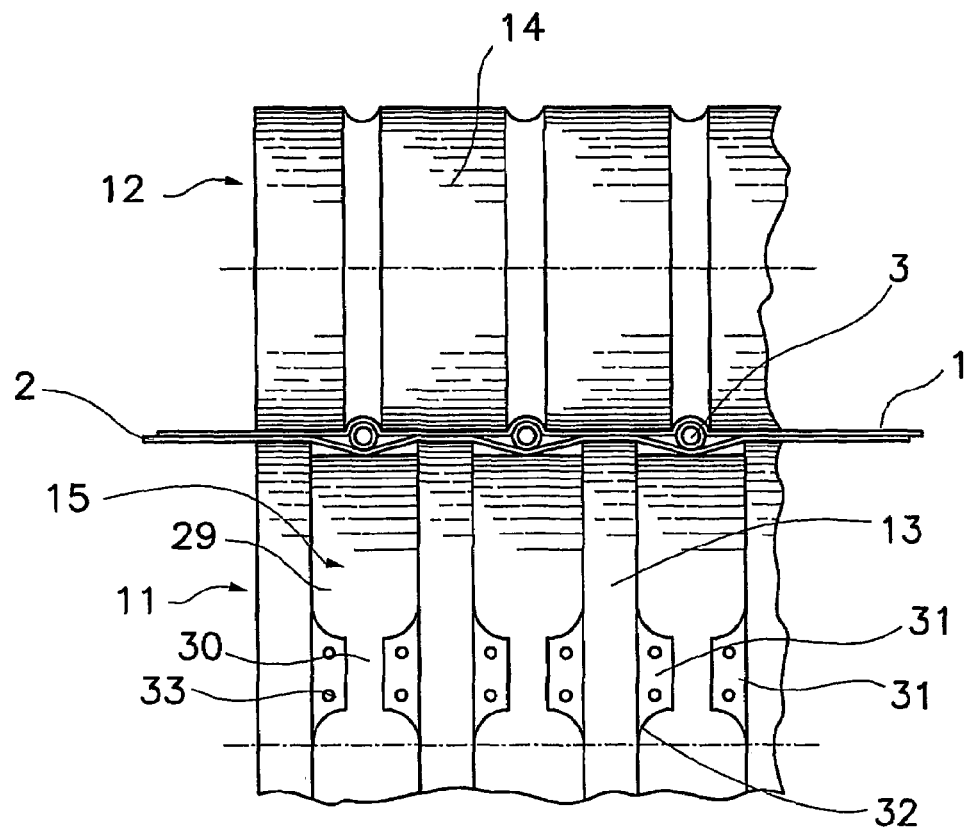
FIG. 5 is equivalent to FIG. 4 but it shows the operation of the asssembly of heating-pressing rollers, having the sheets and injecting ducts interposed.

According to the invention and as it can be clearly seen in FIGS. 4 and 5, the said grooves (15) of the heating roller (11) show relatively long wide lengths (29), connected to each other by relatively short narrow lengths (30) having a width just sufficient for the passage of one of the feeding ducts (3) covered by related sheet (1) while the said grooves (16) of the pressing roller (12) have a constant width, just sufficient for the passage of one of the feeding ducts (3) covered by related sheet (1).

According to mentioned drawings the said grooves (15) of the heating roller (11) have a rectangular cross section, with cylindrical bottom parallel to the said external cylindrical surface (13) and with a constant deepness, while the grooves (16) of the pressing roller (12) have a convex bar profile cross section and constant deepness, the deepness of one and the other rollers (11, 12) being complementary to provide a total height just sufficient for the passage of the feeding ducts (3) covered on both sides by the sheets (1, 2). The said feeding ducts (3) will be flexible in a preferred embodiment, for example of plastic material compatible with the food standard. In addition and preferably, the pressure on all the injection feeding ducts (3) is approximately the same and is essentially kept even during the process.

As it can be clearly seen in mentioned FIGS. 4 and 5, the narrow lengths (30) of the grooves (15) of the heating roller (11) are formed by pairs of supplementary parts (31), fixed in positions respectively facing each of the two circumferential edges parallel of primary grooves having a constant cross section equal to the cross section of the said wide lengths (29). In the example of embodiment illustrated the said supplementary parts (31) are fixed to the bottom of the said primary grooves by removable locking means, such as screws (33) or bolts and the parts (31) possess arcuated end configurations (32) which provide a curvilinear transition between the wide lengths (29) and the narrow lengths (30).

Figure 6:
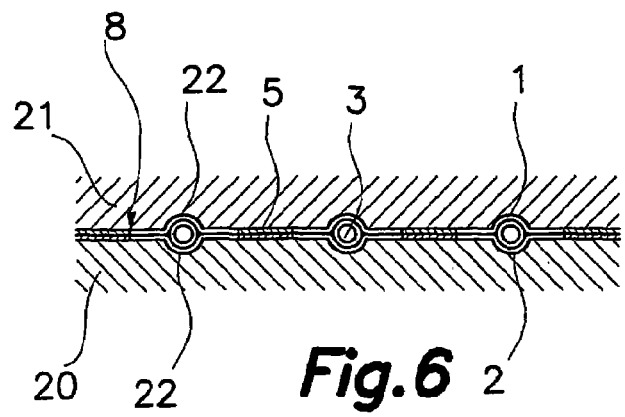
FIGS. 6 and 7 illustrate in elevation and sectional the arrangement taken by the sleeves formed by longitudinal welding between the pressing and closing cylinders, close to the pressure filling area.
Figure 7:
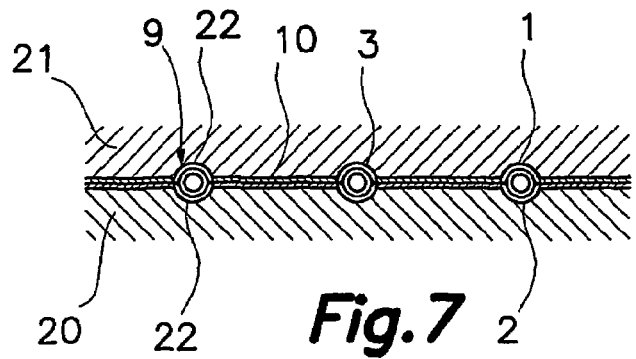

On the other hand and as confirmed by FIGS. 5 to 7, as well the grooves (19) of the cooled roller (17) and its pressing roller (18) as grooves (22) of the pair of pressing-closing rollers (20, 21) have a constant convex bar profile cross section similar to the cross section of the grooves (16) of the pressing roller (12) of the heating roller (11).

In FIGS. 5 and 7, the function of the assembly of pressing closing rollers (20, 21) can be seen, illustrated in FIG. 6 the step in which the pair of sheets shows the wider portion (6) containing the duct (3) operating the rollers (20, 21) on the areas (5) illustrated in FIG. 3 of the pair of heat welded sheets (1, 2) while FIG. 7 shows the main operation of the said rollers (20, 21) fitted on the narrow area (9) and supported on the wider parts (10) thereof.

The said higher and lower walls of the sleeves (6) as well at their wide lengths (8) as at their narrow lengths (9) are pressed to each other and against the external surfaces of the feeding ducts (3) by means of the said pair of closing rollers (20, 21) provided with circumferential grooves (22), facing each other, having a suitable cross section, at their respective cylindrical surfaces, just before where the injection nozzles (4) are located which end the ducts (3) in order to prevent that the material to be packed (M) flow rearwards and that the air comes within the sleeves (6) which are being filled.

With reference to FIGS. 1 and 2, it can be seen that the said step of pressure closing and cross sealing at regular intervals the said sleeves (6) filled with material to be injection packed (M) is carried out in a nonstop way by means of a plurality of pairs of jaws shaped as cross bars (23, 24) which are respectively located above and under the narrow areas (9) of the sleeves (6) filled with material to be injection packed (M), pressing the higher and lower walls of the said narrow areas (9) against each other to lean them moving the material to be packed (M) outside it and the said jaws moving forwards in the said position together with the sheets (1, 2) a path along which at least one jaw (23) of each of the said pairs of jaws (23, 24) is heated to cross seal a strip of the said sheets (1, 2) including the said narrow areas (9).

The said jaws (23) are heated by means of one or more resistors built in them, the said resistors being fed during a length of the said path when a dynamic connection of contacts (25) located at the external ends of the jaws (23) occurs with stationary oblong supply terminals (26) located on the said length of the sheets (1, 2) path at both sides of them and on the path of the said contacts (25).

And the said jaws (23, 24) have been moved at same speed than the sheets (1, 2) as they are connected by their ends to a power chain (27) operated by suitable means, the said jaws (23, 24) having a bar or cross-bar-like configuration and being in addition guided by its ends at least along the said path when they are moving together with the sheets (23, 24).

The invention claimed is:

1. A process for packing pasty, liquid or semiliquid products, comprising the steps of:

forward nonstop feeding a pair of sheets (1 ,2), respectively above and under a plurality of injection feeding ducts (3) that feed a pasty, liquid or semiliquid material to be packed (M), said ducts (3) being arranged in an array extending parallel to the forwards run of said sheets (1, 2) and ending in respective injection nozzles (4);

longitudinally nonstop sealing said pair of sheets (1, 2) to each other by forming continuous beads (5) having spaced widening portions (10), longitudinally sealed at both sides of each of said feeding ducts (3) producing oblong hollow wrappers or sleeves laterally limited by said beads (5);

forming longitudinally sealed narrowing portions (7) at longitudinally regular intervals on said wrappers or sleeves (6), without shaping higher and lower walls of the oblong wrappers or sleeves, each of said longitudinally sealed narrowing portions (7) having a width sufficient to let pass one of said feeding ducts (3), so that relatively long wide lengths are defined within said wrappers or sleeves (6), said wide lengths (8) are connected to each other by narrow areas (9), corresponding to said longitudinally sealed narrowing portions (7);

nonstop injecting, under pressure, material to be packed (M) from said nozzles (4) into said wrappers or sleeves (6) to form unit (28) of packed material (M), while the sheets (1, 2) are running forward, and closing under pressure and cross sealing at regular intervals said wrappers or sleeves (6) at said narrow areas (9); and wherein said pair of sheets (1,2) are of a thermoplastic material and the beads (5), together with said widening portions (10) are longitudinally nonstop sealed by welding both sheets (1, 2) through heat and pressure to the areas conforming them, said heat and pressure are respectively provided by a heating roller (11) and a pressing roller (12) having on their respective cylindrical surfaces (13, 14) circumferential grooves (15, 16) facing each other and shaped for configuring said wrappers or sleeves (6), and wherein said sheets (1, 2), sealed to each other, are moved forwards with the higher and lower walls of the wrappers or sleeves (6) leaning on each other, leaving only a central space (8, 9) in said wrappers or sleeves (6) for the passage of the feeding ducts (3) up to the end thereof, where said injection nozzles (4) are located through which the material to be packed (M) is nonstop injected, filling completely and inflating said wrappers or sleeves (6) at said wide lengths (8) and at said narrow areas (9), and wherein said higher and lower walls of the wrappers or sleeves (6) at said wide lengths (8) and at said narrow areas (9) are pressed against each other and against the external surfaces of the feeding ducts (3) by means of a pair of closing rollers (20, 21) provided with circumferential grooves (22), facing each other, having a suitable cross section, at their respective cylindrical surfaces, just before where the injection nozzles (4) are located in order to prevent the material (M) from flowing rearwards and the air from entering the wrappers or sleeves (6) which have been filled.

2. Process, according to the claim 1, wherein said step of closing under pressure and cross sealing at regular intervals is nonstop carried out by means of a plurality of pairs of cross-bar-shaped jaws (23, 24) which are respectively located above and under the narrow areas (9) of the wrappers or sleeves (6) filled with material (M), pressing the higher and lower walls thereof against each other to lean them by moving the material (M) out of them and the jaws of which move to a position close to said sheets (1,2), along a path, wherein at least one jaw (23) of each of said pairs of jaws (23, 24) is heated for cross sealing a strip of said sheets (1, 2) including said narrow areas (9).

3. Process, according to claim 2, wherein said jaws (23) are provided with heated resistors built in them, said resistors being heated during a length of said path when a dynamic connection of contacts (25) located at external ends of the jaws (23) occurs with stationary oblong supply terminals (26) located on said length of said path at both sides of said sheets (1, 2) and on the path of the said contacts (25).

4. Process, according to claim 2, wherein said jaws (23, 24) are moved at the speed of the sheets (1, 2) as they are connected by their ends to power chains (27) operated by suitable means, said jaws (23, 24) having a bar or cross-bar-like configuration and being guided by their ends at least along said path when they are moving together with the sheets (1, 2).

5. A machine for packing pasty, liquid or semiliquid products comprising sequentially arranged:

means for arranging in a forwards nonstop run a pair of sheets (1, 2), of a thermoplastic material, respectively above and under a plurality of feeding ducts (3) for feeding a pasty, liquid or semiliquid material to be packed (M), said ducts (3) being arranged parallel to the forwards run of said sheets (1, 2) and ending in respective injection nozzles (4);

a heating roller (11) and a first pressing roller (12) having on their respective cylindrical surfaces (13, 14) with circumferential grooves (15, 16) facing each other, for forming longitudinally nonstop heat sealed beads (5) having spaced widening portions (10) at both sides of each of said feeding ducts (4) to form sleeves (6) having spaced narrow areas (9);

a cooled roller (17) and a pressing second roller (18), both provided with circumferential grooves (19), facing each other, for cooling the welding of said heat sealed beads (5);

a pair of closing rollers (20, 21) provided with circumferential grooves (22), facing each other, located just before said injection nozzles (4) for pressing the sheets (1, 2) against each other and against the external surfaces of the feeding ducts (3) in order to prevent the material (M) from flowing rearwards and the air from entering said sleeves (6); and a plurality of pairs of cross jaws (23, 24), which are respectively located above and under said narrow areas (9) of said sleeves (6) for pressing the higher and lower walls thereof against each other to lean them and to move them forwards in pressing position together with the sheets (1, 2) in a path along which at least one jaw (23) of each of the pairs of said jaws (23, 24) is heated for transversally sealing a strip of said sheets (1, 2);

wherein said grooves (15) of the heating roller (11) comprises relatively long wide lengths (29), connected to each other by relatively short narrow lengths (30) having a width just sufficient for the passage of one of the feeding ducts (3) covered by one of the sheets (1) while said grooves (16) of the pressing roller (12) have a constant width, just sufficient for the passage of one of the feeding ducts (3) covered by the other sheet (2).

6. Machine according to claim 5, wherein said grooves (15) of said heating roller (11) have a rectangular cross section, with cylindrical bottom parallel to said external cylindrical surface (13) and with a constant deepness, while the grooves (16) of the pressing roller (12) have a convex bar profile cross section and constant deepness, the deepness of the rollers (11, 12) being complementary to provide a total height just sufficient for the passage of the feeding ducts (3) covered on both sides by the sheets (1, 2).

7. Machine according to claim 6, wherein the narrow lengths (30) of the grooves (15) of the heating roller (11) are formed by pairs of supplementary parts (31), fixed in positions respectively facing each of the two circumferential edges parallel to primary grooves having a constant cross section equal to the cross section of said wide lengths (29).

8. Machine, according to claim 7, wherein said supplementary parts (13) have arcuate end configurations (32) which provide a curvilinear transition between the wide lengths (29) and the narrow lengths (30).

9. Machine according to claim 8, wherein said supplementary parts (31) are locked at the bottom of the said primary grooves by removable locking means, such as screws (33) or bolts.

10. Machine, according to claim 6, wherein as well the grooves (19) of the cooled roller (17) and the second pressing roller (18), and the grooves (22) of the pair of closing rollers (20–21) have a constant cross section in convex bar profile, similar to the cross section of the grooves (16) of the first pressing roller (12) of the heating roller (11).

11. Machine according to claim 5, wherein said injection feeding ducts (3) are of flexible material.

* * * * *